Oct. 27, 1964 J. L. MUSIL 3,154,269
DEPLOYABLE, INFLATABLE RING-WING AIRFOIL
Filed March 18, 1963 3 Sheets-Sheet 1
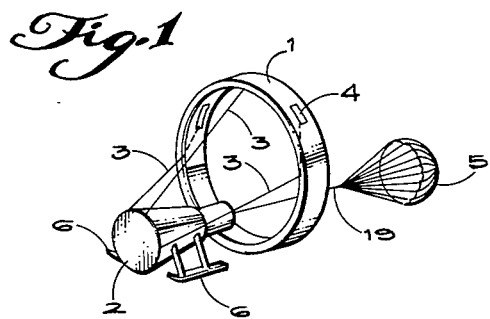
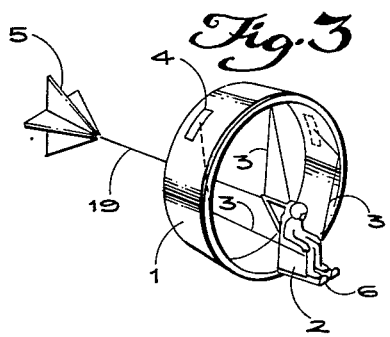
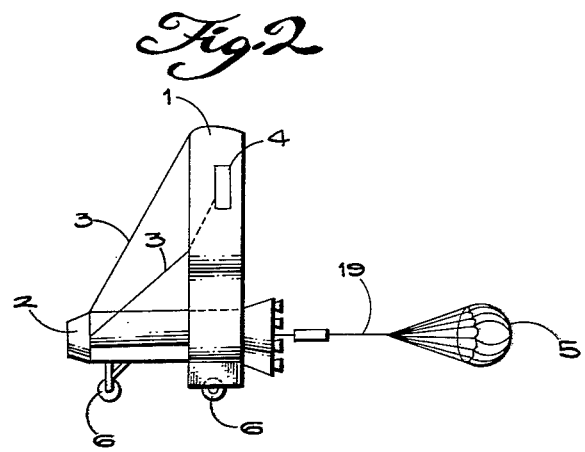
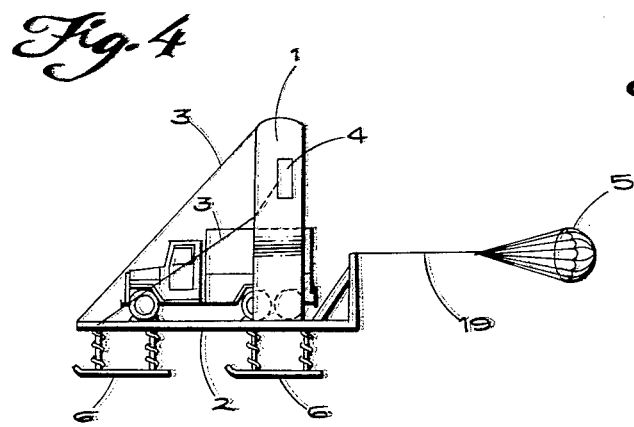
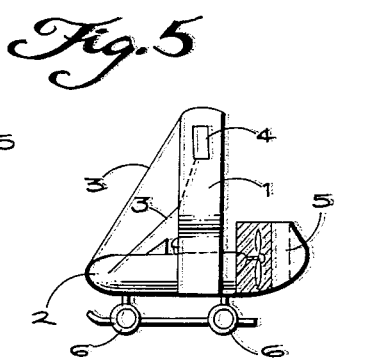
JAY L. MUSIL
INVENTOR.

Oct. 27, 1964                J. L. MUSIL                3,154,269
              DEPLOYABLE, INFLATABLE RING-WING AIRFOIL
Filed March 18, 1963                          3 Sheets-Sheet 2
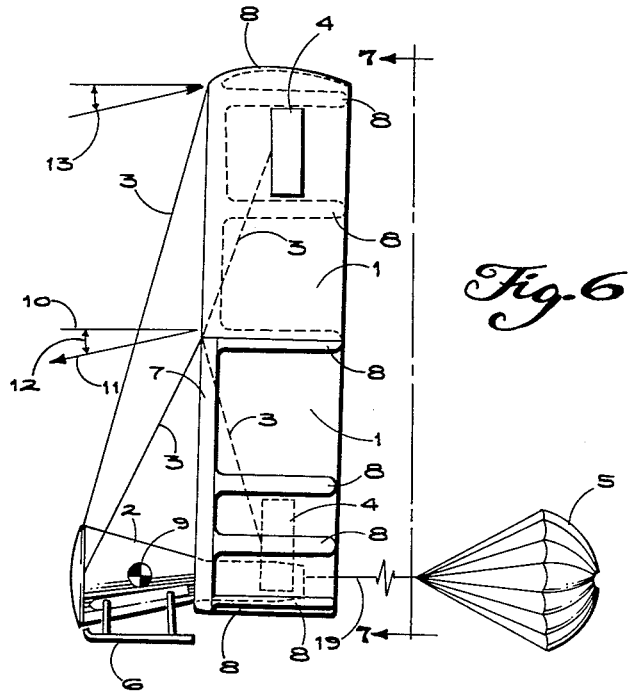
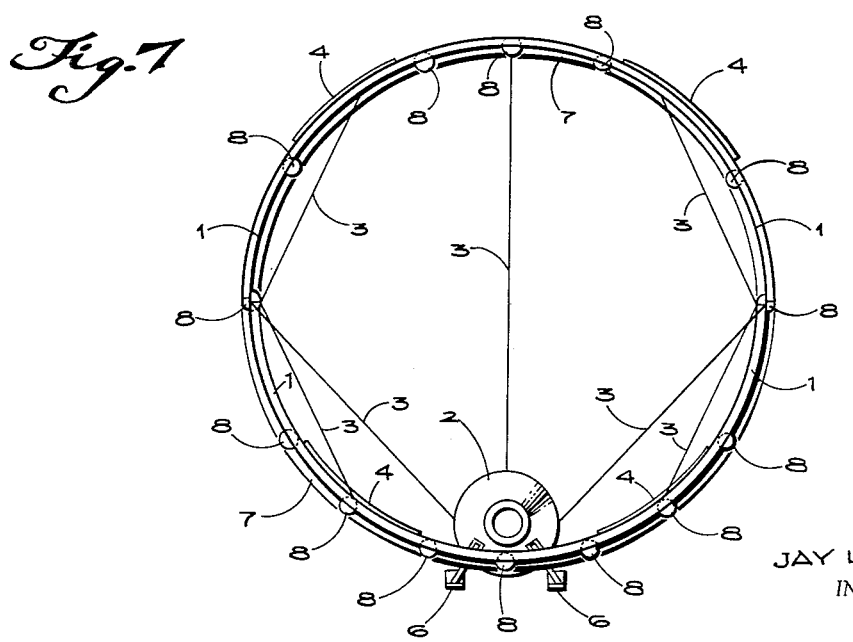
JAY L. MUSIL
*INVENTOR.*

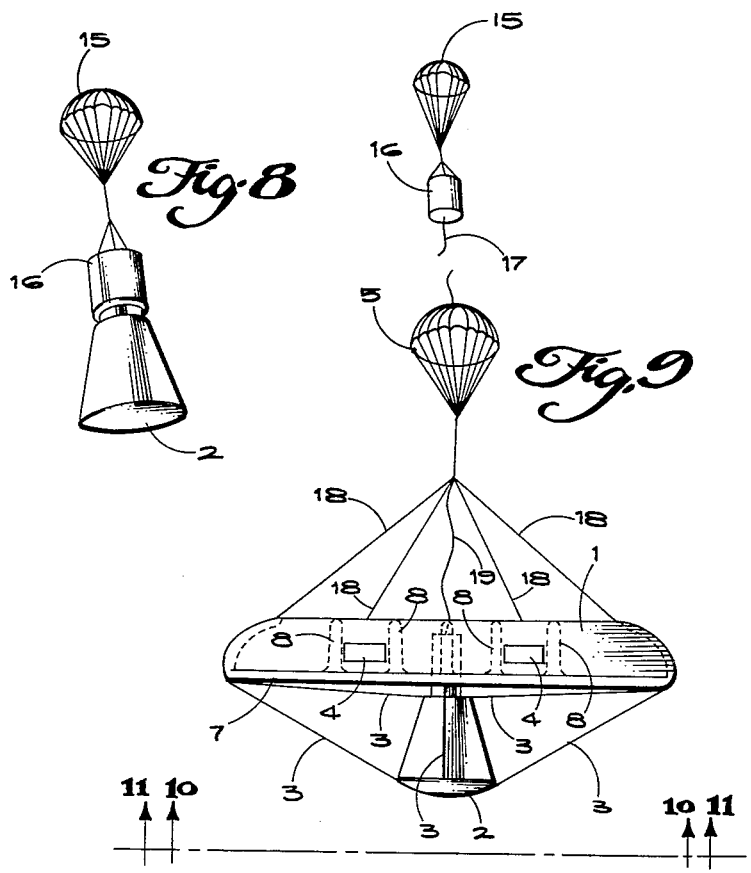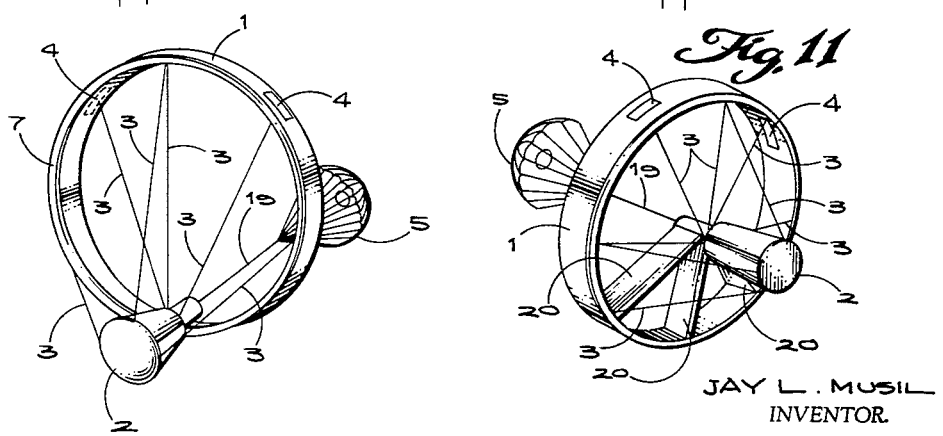

United States Patent Office 3,154,269
Patented Oct. 27, 1964

3,154,269
DEPLOYABLE, INFLATABLE RING-WING
AIRFOIL
Jay L. Musil, R.R. 1, Box 359, Lake County, Ill.
Filed Mar. 18, 1963, Ser. No. 266,098
3 Claims. (Cl. 244—34)

This invention relates to a new and useful application for a deployable, inflatable ring-wing airfoil to effect recovery and particularly the landing of initially wingless airborne vehicles in a manner characteristic of conventional winged aircraft.

The configuration of a ring-wing airfoil as applied to airborne vehicles is not new. For example, it has been used extensively in the past as a ring tail assembly for the stabilization of bombs and wingless missiles delivered from aircraft and ground based launching weapons. Furthermore, the configuration of the deployable, inflatable ring-wing airfoil in its operating state will quite closely resemble the shape of the "Gary Flying Machine" which had its vintage about the year 1910. A French-German team has experimented with a VTOL aircraft called the "Coleopter" which also uses an annular wing configuration.

Thus, the new and patentable features of this invention are considered to be principally, the ability to package the deployable, inflatable ring-wing airfoil in an appropriately shaped container attached to the recoverable vehicle and then deploy and inflate the ring-wing airfoil at a selected time and under conditions where its operation is desired.

Heretofore, the safe recovery of wingless airborne vehicles returning to the surface of the earth has been accomplished using conventional parachutes. While this device has been proved to be safe and reliable with minimum bulk and weight requirements, it has certain limitations. Among these are; the conventional parachute is incapable of accomplishing any substantial maneuvering to control impact of the supported vehicle to favorable landing areas, to avoid obstacles, or to overcome dispersion caused by winds encountered during descent. This can lead, more often than not, to problems associated with location and retrieval of the recoverable vehicle after landing; the possibility of destructive impact of the recoverable vehicle with surface obstacles; or the landing of the vehicle in inaccessible areas.

The consideration of a deployable lifting device for recovery of space vehicles has received considerable attention in the past few years. The most popular device which embodies this concept is known as the "paraglider" or Rogallo Flexikite. It is currently undergoing considerable investigation sponsored by the National Aeronautics and Space Administration.

Analytical investigations, in particular "The Ring Airfoil in Non-axial Flow" by H. S. Ribner presented in the Journal of the Institute of the Aeronautical Sciences' issue of September 1947, show that the lifting effectiveness of the ring airfoil configuration has twice the effectiveness of an elliptical flat plate airfoil that spans the diameter of the ring and has one quarter of the plan area of the ring. Ribner also indicates that the angle of downwash and the ratio of lift to induced drag are the same for the two airfoils. Although the preceding statements imply that there is essentially no gain in the use of the ring-wing configuration in terms of lifting surface area and therefore bulk and weight for a particular lifting requirement, the configuration of the ring shape as embodied by this invention will facilitate attachment, deployment, inflation and suspension requirements which would substantially reduce the overall system weight, structural supporting, and control problems as compared with a deployable, inflatable, conventional wing-like configuration. Furthermore, in comparison with the paraglider configuration, the ring-wing configuration can be designed with a substantially higher aspect ratio than the paraglider for the same plan area. Thus, the lifting effectiveness of the ring-wing airfoil, as implied by aspect ratio, will be higher than the paraglider for the same plan area.

The primary object of this invention is to provide a new and useful application for a deployable, inflatable ring-wing airfoil which will provide a lifting capability for various types of initially wingless airborne vehicles so that they may be landed on a suitable area of the earth's surface with safety and reliability.

It is a further object of this invention to provide a flexible lifting device which, when deployed and inflated in its operational state, will essentially have a ring-wing airfoil configuration.

Another object of this invention is to provide a deployable, inflatable ring-wing airfoil which, when it is in a non-operating state, will be sufficiently flexible for packaging in an appropriate container attached to the recoverable vehicle.

It is another object of this invention to provide a deployable, inflatable ring-wing airfoil with aerodynamic spoilers appropriately located on the ring-wing lifting surface to effect lateral and longitudinal control of the ring-wing and recoverable, airborne vehicle to which the ring-wing airfoil is attached.

A further object of this invention is to provide a deployable, inflatable ring-wing airfoil which can be deployed and inflated in a controlled, orderly manner without imparting harmful loads and stresses on the occupants and/or contents aboard the recoverable airborne vehicle.

Further and additional objects of this invention will become obvious from a consideration of this specification, the accompanying drawings and the appended claims.

For a more complete understanding of this invention reference will now be made to the accompanying drawings wherein:

FIGURE 1 is an oblique view of the embodiment of this invention for the recovery of manned or instrumented space vehicles returning to the earth's surface after extra-atmospheric flight.

FIGURE 2 is a side elevation view of the embodiment of this invention for the recovery of large size rocket powered boosters.

FIGURE 3 is an oblique view of the embodiment of this invention for the recovery of personnel under conditions of emergency escape from disabled aircraft.

FIGURE 4 is a side elevation view of the embodiment of this invention as applied for the aerial delivery of cargo.

FIGURE 5 is a side elevation view of the embodiment of this invention as applied for civilian sport or military liaison aircraft.

FIGURE 6 is a diagrammatic, side elevation view of the embodiment of FIGURE 1 illustrating the essential characteristics and features comprising this invention.

FIGURE 7 is a diagrammatic, rear elevation view of FIGURE 6.

FIGURES 8 and 9 are schematic illustrations showing in sequence a method for deployment and inflation of this invention for the embodiment of FIGURE 1.

FIGURE 10 is an oblique view illustrating the transition from the deployment and inflation stage of FIGURES 8 and 9 to the lifting mode as achieved by lateral translation of the ring-wing.

FIGURE 11 is an oblique view illustrating an alternative technique for transition of the ring-wing to the lifting mode from the deployment and inflation stage illustrated by FIGURES 8 and 9.

Referring now to the drawings, and more particularly to FIGURES 6 and 7, a recoverable airborne vehicle 2 is diagrammatically shown in FIGURE 6 coupled at the extreme lower portion to the deployable, inflatable ringwing airfoil 1. The nose of the vehicle 2 is shown blunted characteristic of current manned space capsule configurations, although it will be clear that any vehicle configuration may be utilized with the invention as illustrated by FIGURES 1 through 5. The center of gravity of the vehicle 2 as illustrated by indicia 9 indicates that the center of gravity of the vehicle 2 is disposed substantially foreward of the ring-wing thereof. The proper relationship of this dimension is determined in conjunction with the effectiveness of the trailing aerodynamic stabilizing device 5 which purpose is to aerodynamically trim the ring-wing device 1 and vehicle 2 for the desired equilibrium glide angle 12. The trailing aerodynamic stabilizing device 5 may have various forms. FIGURES 1, 2, 4, and 6 show the stabilizing device 5 in the form of a drogue parachute and FIGURES 3 and 5 show the device in the form of conventional aerodynamic surfaces.

In order to illustrate more emphatically the characteristics of this invention, a particular embodiment for a deployable, inflatable ring-wing airfoil 1 and vehicle 2 of FIGURES 6 and 7 is presented. A ring-wing with an aspect ratio of 5 is chosen where aspect ratio is defined, after Ribner, as $8R/\pi C$. R and C are, respectively, the ring-wing radius and chord. The choice of aspect ratio for the ring-wing airfoil will usually be made on the basis of considerations related to the desired ring-wing performance, bulk and weight, control method, deployment and inflation technique, etc. It is believed that a practical range for the ring-wing airfoil aspect ratio on the basis of these considerations will be between the values of 2.0 and 8.0. The vehicle, ring-wing system is defined to have a total weight of 3000 lbs. For this configuration, a vertical sinking speed of 10 feet per second at standard sea level conditions is selected as being well within the response capabilities of human piloting techniques for control of approach and landing flare-out maneuvers. On the basis of the characteristics defined above; and upon considering the lift and induced drag of the ring-wing after Ribner, parasitic drag of the vehicle and suspension lines, and profile drag of the ring; results in a ring-wing with a diameter of 40.6 feet and chord width of 10.33 feet. When the ring-wing, is trimmed at an angle of attack 13 of 11° the resultant lift to drag ratio for the system is 6.4, giving a flight path 11 deflected below the horizon line 10 at a glide angle 12 of about 9°. The velocity of the system along the glide path 11 will be about 43.5 miles per hour for standard sea level conditions.

The weight for the deployable, inflatable ring-wing airfoil system as embodied in the above description, including the ring-wing 1 composed of flexible, single ply, non-porous membrane material for the lifting surface; inflatable leading edge tubing 7; inflatable chordwise ribs 8; suspension, rigging and control lines 3; inflation medium and container (or mechanism); aerodynamic spoiler controls 4 and control actuation system; etc., will be about 10 to 12 percent of the total recovered weight or about 300 to 360 pounds in this example.

The recoverable vehicle, ring-wing recovery system described above will have a lateral maneuver capability of about 70 to 80 miles when the operation of the deployable, inflatable ring-wing airfoil is initiated at an altitude near 75,000 feet as illustrated in FIGURES 8 and 9.

It is estimated that the weight requirements for a deployable, inflatable ring-wing airfoil recovery system for a 1,000,000 pound empty weight booster as embodied in FIGURE 2, will be on the order of 7 to 8 percent of the total recovered weight. This would include the ring-wing 1, deployment and inflation equipment, suspension lines 3, control surfaces 4 and control actuation equipment, landing gear 6, and turbojet engines with sufficient jet fuel to give a flying range of the order of 500 miles which, for typical performance of such vehicles, should be adequate to return and land the booster within close proximity to the launch base.

Among the most important considerations which will determine the usefulness of the deployable, inflatable ring-wing airfoil for airborne vehicle recovery applications will be the ability to package, deploy and inflate the device.

Packaging considerations and the method used to deploy and inflate the ring-wing airfoil must of necessity take into account the basic construction of the ring-wing profile section. Although a conventional airfoil shape becomes immediately apparent it is considered that a configuration approaching a thin membrane section 1 as shown in FIGURE 6 will lend itself much more readily to packaging considerations without providing too severe a penalty on aerodynamic performance characteristics.

One embodiment of the deployable, inflatable ring-wing airfoil as illustrated in FIGURES 6 and 7 consists of an inflatable leading edge tube 7 which diameter should not exceed about 10 percent of the chord width for reasons of aerodynamic efficiency. A thin trailing membrane 1 is attached to the tubing 7 to form the chord width of the ring-wing. Inflatable ribs 8 extending from the leading edge tube 7 are spaced circumferentially as required to give chordwise stiffness to the membrane to form and hold the ring-wing in shape.

A means of accomplishing deployment and inflation for the deployable, inflatable ring-wing airfoil recovery device is illustrated in FIGURES 8 and 9. As shown in FIGURE 8 a small pilot parachute 15 is attached to a cover 16 which encloses the stabilization device 5 and deployable, inflatable ring-wing airfoil 1 within its container. During deployment, shown in FIGURE 9, the pilot parachute 15 extracts cover 16 which in turn extracts the stabilization device 5 by means of a low strength static line 17 connecting the two. The strength of the static line 17 is selected to break after complete extension of the stabilization device 5. Initially, the stabilization device 5 is connected to the ring-wing airfoil 1 by means of lines 18 which are attached at selected positions to the trailing edge of the ring-wing. At this time the riser line 19 connecting the stabilization device 5 to the vehicle 2 is slack. The object of this arrangement is to transmit the aerodynamic loads of the stabilization device 5 by lines 18 to effectively foreshorten the trailing edge diameter of the ring-wing 1 and thus allow the initial aerodynamic loads on the ring-wing to assist its inflation as in the manner of a conventional parachute. After a suitable interval, lines 18 will be severed allowing the ring-wing to inflate to its design operating configuration by pressurizing the leading edge tubing 7 and chordwise ribs 8 at a controlled and gradual rate.

After deployment and inflation in this fashion it will be necessary to translate the ring-wing laterally with respect to the vehicle's longitudinal axis as illustrated in FIGURE 10 to utilize the rigidity of the vehicle 2 for support of the lift loads tending to collapse the lower half of the ringwing inwardly. In lieu of this, it is possible to inflate three tubes 20 in spoke-like fashion as shown in FIGURE 11 which supply the compressive loads required to support the lift of the lower half of the ring-wing.

In the application of the deployable, inflatable ring-wing airfoil a source of pressurizing gas will be required to inflate the leading edge tubing 7 and chordwise ribs 8 to aid in maintaining the rigidity for operation of the ring-wing. A wide variety of techniques can be considered to provide this required pressurization. Some of the possible techniques are: (a) gas under high pressure in a self contained tank aboard the vehicle; (b) chemical gas generator; (c) wind driven compressor; (d) bleed-off of compressed gas from an auxiliary power source aboard the vehicle; (e) pressurization by vaporization of residual propellants on board the vehicle; (f) self inflation from aerodynamic forces by initial shaping of the ring-wing at deployment.

The suspension and rigging system employed with the deployable, inflatable ring-wing airfoil will be closely associated with methods of control. The physical methods of accomplishing control actuation are varied, and the selection of one of several techniques will usually be based on minimizing weight, bulk and complexity of the overall system.

The manner in which aerodynamic control would be accomplished for the application of the deployable, inflatable ring-wing airfoil is influenced by several aerodynamic, design and flexibility factors. For a particualr application, optimization of these considerations will require the use of experimental wind tunnel and free-flight testing. With regard to aerodynamic control, however, it is considered that spoiler controls 4 should be utilized rather than conventional aileron controls to minimize aerodynamic cross-coupling effects among the longitudinal and lateral modes of motion when performing controlled maneuvers. Referring to FIGURES 6 and 7 directional control would be achieved by differential deflection of flapped aerodynamic spoilers 4 located on the ring-wing 1 surface by means of a single reversible motor-driven winch and control lines. Glide control could be effected by simultaneous deflection of the spoiler flaps with a separate reversible motor driven winch.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. A deployable, inflatable ring-wing airfoil consisting of a ring-wing, an inflatable leading edge tube on said ring-wing having a diameter of the order of 10 percent of the chord width extending the length of the circumference of the ring-wing, and inflatable chordwise ribs, a number of which are spaced about the circumference of the ring-wing, which, when inflated provide chordwise rigidity to the aerodynamic lifting surface of the ring-wing itself, and which consists of a thin, single ply, flexible, non-porous material.

2. A deployable, inflatable ring-wing airfoil as embodied in claim 1, deployable from a recoverable airborne vehicle of arbitrary shape for maintaining aerodynamic gliding flight of said recoverable airborne vehicle, comprising means integral with said ring-wing for securing the inflation thereof, said inflation means comprising an inflation gas source and further comprising means for defining the spatial relationship between said ring-wing and associated recoverable airborne vehicle, said spatial relationship means comprising suspension and rigging cables and inflatable tubes extending between said ring-wing and recoverable airborne vehicle.

3. A deployable, inflatable ring-wing airfoil in accord with claim 2, wherein said ring-wing and associated recoverable airborne vehicle further comprises means for control of the longitudinal and lateral motion about and the direction of the flight path of said ring-wing and recoverable airborne vehicle, said control means comprising aerodynamic control devices attached to the aerodynamic lifting surface of said ring-wing and actuated by control line means extending between said control devices and associated recoverable airborne vehicle.

References Cited by the Examiner

UNITED STATES PATENTS

| | | | |
|---|---|---|---|
| 2,907,536 | 10/59 | Zborowski | 244—34X |
| 2,948,111 | 8/60 | Nelson | 244—34X |
| 2,952,422 | 9/60 | Fletcher et al. | |
| 2,991,027 | 7/61 | Geyling | 244—1X |
| 3,017,139 | 1/62 | Binder | 244—34X |
| 3,079,113 | 2/63 | Meyer | 244—1X |
| 3,083,934 | 4/63 | Vanderlip | 244—5 |
| 3,106,373 | 10/63 | Bain et al. | 244—117 |
| 3,109,607 | 11/63 | Lally | 244—1 |

FOREIGN PATENTS 463,701 8/28 Germany.

OTHER REFERENCES

Page 45 of Space/Aeronautics, December 1962.
Pages 54 and 55 of Aviation Week, Sept. 19, 1960.
Pages 57, 59 and 63 of Aviation Week, Sept. 19, 1960.
Pages 22–25 of Aero Digest, June 1955.

FERGUS S. MIDDLETON, *Primary Examiner.*

MILTON BUCHLER, *Examiner.*